March 28, 1961  J. V. BLYTH  2,976,974
UNI-DIRECTIONAL TRANSMISSION DEVICES
Filed May 1, 1959

INVENTOR
JACK V. BLYTH
BY
*Watson, Cole, Grindle & Watson*
ATTORNEYS

2,976,974
UNI-DIRECTIONAL TRANSMISSION DEVICES

Jack Vallis Blyth, Ewell, England, assignor to D. Napier & Son Limited, London, England, a British company Filed May 1, 1959, Ser. No. 810,275

Claims priority, application Great Britain May 20, 1958

6 Claims. (Cl. 192—67)

This invention relates to uni-directional transmission devices of the kind comprising driving and driven positive clutch elements connected respectively to driving and driven members and arranged to be engaged and disengaged by axial movement of the one clutch element relatively to the other, this movable clutch element being connected to the associated driving or driven member by a coupling such as a screwthread, such that relative rotation between the two causes axial movement of the movable clutch element, and including an auxiliary frictional transmission device arranged for transmission of limited torque between the two clutch elements, comprising a pair of co-operating frictional elements.

It is an object of the present invention to provide an improved device of this type which will reduce the frictional rubbing load on the frictional transmission device when the main positive clutch is out of engagement and which will automatically increase this load when the relative rotation between the two members is such that the main clutch tends to engage.

Now according to the present invention one of the frictional elements is connected to the respective clutch element so as to rotate therewith, in such a way as to be free to move longitudinally thereon, this friction element being connected to a cam member which co-operates with a mating cam secured to the respective driving or driven member such that relative rotation between the two cams causes the friction element to move in a direction to increase the friction loading between the two friction elements.

Preferably the said friction element is connected to the movable clutch element.

Thus when the main clutch elements are fully disengaged the frictional loading is automatically reduced.

In a preferred arrangement the frictional transmission device incorporates a resilient element arranged to increase the frictional loading when compressed.

Conveniently the resilient element comprises a dished annular washer and itself constitutes one half of the frictional transmission device.

According to a preferred feature of the invention the co-operating cam surfaces comprise two mating sets of inclined ramps or teeth arranged on annular surfaces, the pitch of the ramps measured angularly from the axis being at least equal to the total angular rotation of the movable clutch element during its travel.

More particularly it is preferred that the inclination of the inclined cam surfaces to the main axis of rotation is approximately equal to the helix angle of the screwthread coupling between the movable clutch element and the respective driving or driven member.

The invention may be performed in various different ways but one specific embodiment will now be described by way of example with reference to the accompanying drawings in which.

Figure 1:
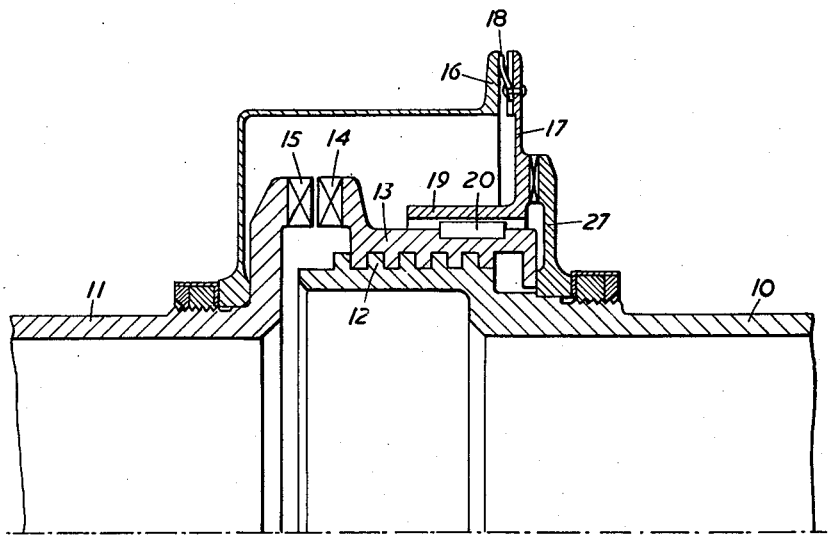
Fig. 1 is a sectional side elevation through a transmission device.
Figure 2:
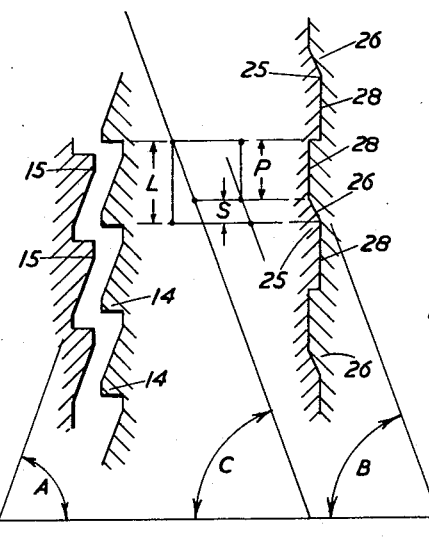
Figure 2 is a development of the main dog teeth and the cam members.

In this example the invention is applied to a unidirectional transmission or free-wheel drive between two co-axial shafts 10, 11 referred to as the driving and driven members. The driving member 10 is formed at its end with an external quick-pitch screwthread 12 or a series of helical splines, and surrounding this part of the driving shaft there is arranged a sleeve 13 constituting a movable clutch element which has a co-operating internal screwthread and is formed with a series of dogs 14 at one end which co-operate with a corresponding series of dogs 15 on the driven shaft 11 when the movable clutch element moves towards the driven shaft. These two sets of dogs 14, 15 are provided with inclined reverse surfaces or ramps inclined at an angle A to the axis as shown in Figure 2, to facilitate engagement and disengagement.

A frictional transmission device is provided between the movable clutch element 13 and the driven shaft 11 and comprises a first friction member 16 which is of annular form and is securely attached to the driven shaft, and a second friction member 17 which includes an annular dished resilient pad 18 bearing against the annular face of the first friction member. This pad 18 is secured to the outer edge of the flange 17, which is formed integral with a sleeve 19 surrounding the movable clutch element 13, and connected thereto by splines or keys 20 so as to be able to move longitudinally thereon without relative rotation. Thus any torque transmitted by the frictional members in response to relative rotation between the driving and driven shafts will tend to cause the movable clutch element 13 to rotate on the driving shaft 10 and so to move on the screwthreaded coupling either towards or out of engagement with the dogs 15 formed on the driven shaft.

The radial flange 17 on the sleeve 19 carrying the friction pad 18 is provided with its annular face remote from the driven shaft with a series of inclined teeth or ramps 25 extending in a generally circumferential direction. These inclined cam surfaces are arranged to cooperate with a corresponding series of similarly inclined surfaces 26 on a ring 27 rigidly secured to the driving shaft. The inclination B of these cam surfaces with respect to the main axis of rotation is equal to the pitch or helix angle C of the screwthread coupling 12 between the movable clutch element 13 and the driving shaft 10. The cam surfaces 25, 26 are flat topped, that is to say each inclined surface is continued by a corresponding surface 28 lying in a plane normal to the main axis of rotation. The total arcuate length L being the sum of the length P of each inclined surface 28 together with the projected length S of the adjacent cam surface 25 or 26, subtends an angle at the axis of rotation which is not less than the limit of angular rotation of the element 13 on the screwthread 12, this limit being determined by the helix angle C and the angular intervals between the dog teeth 14, 15. Thus the cam surfaces 25, 26 are never permitted to "ratchet" over one another, each pair of cam surfaces remaining in mutual engagement.

In operation therefore when the driving shaft 10 starts to over-run the driven shaft 11 in the direction to engage the positive clutch, the resultant frictional drag exerted by the frictional transmission device 18, 16 tends to cause the outer sleeve 19 to rotate and this initiates rotation of the movable clutch element 13 on the driving shaft and at the same time causes the cam surfaces 25, 26 to ride up their co-operating inclined flanks thus slightly compressing the resilient friction pad 18 and so increasing the frictional load. After a first small angular movement of the outer sleeve 19 the cam surfaces 25, 26 reach their flat-topped summits 28 and no further axial movement is imparted thereto and the spring loading on the resilient pad 18 remains constant at the increased value. Further relative rotation of the driving shaft 10 thus causes the movable clutch element 13 to move axially to engage the main positive clutch dogs 14, 15.

Relative rotation between the driving and driven shafts in the opposite direction causes the movable clutch element 13 to rotate in the opposite direction to disengage the main positive clutch dogs 14, 15 and at the limit of its travel the cam surfaces 25, 26 which have slipped over their flat-topped summit portions 28 then slide down their inclined flanks thus reducing the load on the resilient pad 18. This reduced load correspondingly reduces the friction and wear on the parts 18, 16, which may be in rubbing engagement for lengthy periods.

What I claim as my invention and desire to secure by Letters Patent is:

1. A uni-directional transmission device comprising driving and driven members, driving and driven positive clutch elements connected respectively to said driving and driven members, and arranged to be engaged and disengaged by axial movement of one clutch element relatively to the other, one clutch element being connected to a first one of the two members by a helical coupling such that relative rotation between this element and the said first member causes relative axial movement of said movable clutch element, and including an auxiliary frictional transmission device transmitting limited torque between the two clutch elements to initiate the said rotation of the one clutch element, comprising a pair of co-operating frictional elements, one of which is connected to the respective clutch element so as to rotate therewith, while being free to move longitudinally thereon, a cam connected to this friction element, and a mating cam secured to the member to which said clutch element is connected, such that relative rotation between the two cams tending to cause the clutch elements to engage, causes the said friction element to move axially in a direction to increase the friction loading between the two friction elements.

2. A uni-directional transmission device as claimed in claim 1 in which the said friction element is connected to the movable clutch element.

3. A uni-directional transmission device as claimed in claim 1 in which the frictional transmission device incorporates a resilient element arranged to increase the frictional loading when compressed.

4. A uni-directional transmission device as claimed in claim 3 in which the resilient element comprises a dished annular washer and itself constitutes one half of the frictional transmission device.

5. A uni-directional transmission device as claimed in claim 1 in which the co-operating cams comprise two mating sets of inclined ramps or teeth arranged on annular surfaces, the pitch of the ramps measured angularly from the axis being at least equal to the total angular rotation of the movable clutch element during its travel.

6. A uni-directional transmission device as claimed in claim 5 in which the inclination of the inclined cam surfaces to the main axis of rotation is approximately equal to the helix angle of the helical coupling between the movable clutch element and the respective driving or driven member.

References Cited in the file of this patent

UNITED STATES PATENTS

| 1,904,563 | Strout | Apr. 18, 1933 |
| 2,892,524 | Sinclair | June 30, 1959 |

FOREIGN PATENTS

| 145,695 | Great Britain | Nov. 30, 1921 |
| 823,402 | France | Oct. 18, 1937 |
| 674,934 | Germany | Apr. 25, 1939 |
| 726,569 | Germany | Oct. 16, 1942 |
| 625,476 | Great Britain | June 28, 1949 |